United States Patent
Hosokawa et al.

(10) Patent No.: US 6,773,693 B2
(45) Date of Patent: Aug. 10, 2004

(54) FINE ZEOLITE PARTICLE

(75) Inventors: Hiroji Hosokawa, Wakayama (JP); Kazuo Oki, Wakayama (JP)

(73) Assignee: Kao Corporation, Tokyo (JP)

( * ) Notice: Subject to any disclaimer, the term of this patent is extended or adjusted under 35 U.S.C. 154(b) by 162 days.

(21) Appl. No.: 10/203,302

(22) PCT Filed: Dec. 25, 2001

(86) PCT No.: PCT/JP01/11326

§ 371 (c)(1), (2), (4) Date: Aug. 9, 2002

(87) PCT Pub. No.: WO02/053498

PCT Pub. Date: Jul. 11, 2002

(65) Prior Publication Data

US 2004/0018146 A1 Jan. 29, 2004

(30) Foreign Application Priority Data

Dec. 28, 2000 (JP) .................................. 2000-402636

(51) Int. Cl.$^7$ ............................................. C01B 39/14
(52) U.S. Cl. ............... 423/702; 423/716; 423/DIG. 24; 510/507; 510/532
(58) Field of Search ................ 423/702, 716, 423/DIG. 24; 510/507, 532

(56) References Cited

U.S. PATENT DOCUMENTS

| | | | |
|---|---|---|---|
| 3,781,225 A | | 12/1973 | Schwartz |
| 4,102,977 A | * | 7/1978 | Sugahara et al. ........... 423/712 |
| 4,431,621 A | | 2/1984 | Taramasso et al. |
| 4,443,422 A | * | 4/1984 | Kostinko .................... 423/710 |
| 5,800,800 A | | 9/1998 | Pinnavaia et al. |
| 5,863,516 A | * | 1/1999 | Otterstedt et al. .......... 423/700 |
| 6,096,820 A | * | 8/2000 | Lockledge et al. ......... 524/450 |
| 6,241,960 B1 | * | 6/2001 | Tops.o slashed.e et al. . 423/700 |

FOREIGN PATENT DOCUMENTS

| | | |
|---|---|---|
| CN | 1 211 537 A | 3/1999 |
| EP | 0 173 901 A2 | 3/1986 |
| EP | 1002764 A1 | 5/2000 |
| JP | 54-81200 | 6/1979 |
| JP | 60-118625 A | 6/1985 |
| JP | 1-153514 | 6/1989 |
| JP | 9-67117 | 3/1997 |
| JP | 2000-154019 | 6/2000 |
| WO | 94/05597 A1 | 3/1994 |

OTHER PUBLICATIONS

Chemical Abstracts Service, Neels et al., XP002202735, Krist. Tech., vol. 13, No. 11, pp. 1345–1350 (1978) Abstract only.
Schmidt et al., Inorg. Chem., vol. 39, pp. 2279–2283, (2000).
Okamura et al., Nendo Kagaku, vol. 27, pp. 21–26, (1987).

* cited by examiner

*Primary Examiner*—David Sample
(74) *Attorney, Agent, or Firm*—Birch, Stewart, Kolasch & Birch, LLP

(57) ABSTRACT

A fine A-type zeolite particle having an average primary particle size of 0.1 μm or less and a variation coefficient of 90% or less, wherein a ratio of a peak area above a background level to all peak are in the range of 2θ=20° to 40° in a powder X-ray diffraction spectrum of said fine A-type zeolite particle is 30% or more; a process for preparing the fine A-type zeolite particle, comprising reacting a silica source with an aluminum source in the presence of an organic compound having an oxygen-containing functional group and a molecular weight of 100 or more; and a detergent composition comprising a surfactant and the fine A-type zeolite particle. The fine zeolite particle is suitably used for detergent builders, water treatment agents, fillers for paper, resin fillers, oxygen-nitrogen separating agents, adsorbents, catalyst carriers, soil improvers for gardening, polishing agents, and the like.

7 Claims, No Drawings

FINE ZEOLITE PARTICLE

This application is the national phase under 35 U.S.C. §371 of PCT International Application No. PCT/JP01/11326 which has an International filing date of Dec. 25, 2001, which designated the United States of America.

TECHNICAL FIELD

The present invention relates to a fine zeolite particle, a process for preparing the same, and a detergent composition comprising the fine zeolite particle.

BACKGROUND ART

Zeolites are crystalline aluminosilicates, which can be classified into various crystal structures such as A-type, X-type and Y-type by the arrangements of $SiO_4$ tetrahedrons and $AlO_4$ tetrahedrons. The zeolites have an even pore size depending upon the crystal structures, thereby exhibiting a molecular sieve function. For the reason, the zeolites have been used for adsorbents, catalysts (carriers) and the like. In addition, since the zeolites have cationic exchange abilities, they have been utilized as detergent builders, agents for waste water treatment, and the like.

The functions of the zeolites greatly depend on the crystal structure and the composition of the zeolite. For instance, the smaller the Si/Al molar ratio of the zeolite, the larger the cationic exchange capacity, and theoretically an A-type zeolite of which Si/Al is 1 is most excellent. Therefore, the A-type zeolites having a high cationic exchange theoretical capacity have been mainly used as detergent builders.

Further, as detergent builders, there are especially needed zeolites excellent in not only the calcium ion exchange capacity but also the calcium ion exchange rate. This is because when calcium ions in water especially at an initial stage of washing can be captured in large amounts, the detergency performance is improved. Since the calcium ion exchange rate of the zeolite is determined by a collision probability of the calcium exchange site of the zeolite with the calcium ions in water, the smaller the primary particle size of the zeolite, the higher the calcium ion exchange rate of the zeolite.

In view of above, various proposals for preparing A-type zeolites having a very small primary particle size have been so far made. For instance, Japanese Patent Laid-Open No. Sho 54-81200 discloses a process for preparing a fine A-type zeolite particle comprising carrying out the reaction in the co-existence of an organic acid such as formic acid or acetic acid in a reaction mixture. However, in this process, the resulting zeolite particle only has a primary particle size of at least 0.5 μm. On the other hand, Japanese Patent Laid-Open No. Hei 1-153514 discloses a process for preparing a fine A-type zeolite particle having a maximal particle size of 0.4 μm or less, comprising forming a zeolite nucleus at a temperature of 40° C. or less. However, even in this process, the formed A-type zeolite particle has a primary particle size of at least 0.2 μm.

Meanwhile, a largest defect of the zeolite builder is in that zeolite makes water turbid due to its water insolubility. In view of this problem, there has been proposed to reduce turbidity of the zeolite by making an aggregate particle size of the zeolite small to a size of equal to or less than a wavelength of visible light (0.4 μm) [Okumura, Nendo Kagaku 27, 21 (1987)]. In other words, the turbidity of the washing water is reduced with making the aggregate particle size smaller, and when the aggregate particle size is 0.4 μm or less, the washing water (zeolite concentration: 0.013% by weight) becomes almost transparent. However, when the A-type zeolite of which aggregate particle size is made very fine to the order of submicron size is made into a powdery state, the powder then re-aggregates to undesirably form a large aggregate. Also, it is very difficult to carry out solid-liquid separation for the zeolite by means of filtration or concentration. Therefore, the zeolite has been actually fed to the detergent raw material in a slurry state. At this time, the existence of Al ions in the slurry (unreacted compounds of the zeolite raw materials or zeolite-eluted products) could be a factor of lowering the detergency performance. Therefore, the Al ion concentration in the slurry must be controlled to a low level.

Generally, the aggregate particle size of A-type zeolite is made smaller by means of vigorous stirring, pulverization or the like. For instance, as disclosed in Japanese Patent Laid-Open No. Hei 9-67117, an aggregate particle size and a primary particle size are made smaller to the order of submicron size by mechanical pulverization. However, when an A-type zeolite having a large primary particle size is subjected to pulverization treatment, the cationic exchange abilities, i.e. the cationic exchange capacity and the cationic exchange rate, are undesirably lowered due to the crystallinity degradation caused by the disintegration of primary crystals of the A-type zeolite and the deterioration of the primary particle size distribution. In addition, in a water-based liquid of the zeolite after the pulverization treatment, ions of zeolite-constituting elements, i.e. Al, Si, and Na, especially Al, tend to be easily eluted in water, by the mechanochemical reaction of the zeolite particle surface. Therefore, when the zeolite is used for a detergent composition, there also arises a problem that the detergency performance of the composition is lowered.

In order to suppress the generation of the problems due to the process of making the aggregate particle size of the zeolite smaller, the disintegration of the zeolite primary crystals by the process of making the size fine must be avoided. In order to avoid the disintegration, it is desired that the primary particle size of A-type zeolite before pulverization is equal to or less than the aggregate particle size of the zeolite after pulverization. Concretely, when the average aggregate particle size is made smaller to a size of 0.4 μm or less, the average primary particle size is generally 0.1 μm or less. On the basis of this fact, it is considered to be desirable that the average primary particle size of A-type zeolite before pulverization is 0.1 μm or less in order to suppress the generation of the problems mentioned above and to make the zeolite particle smaller by pulverizing the particle until the particle has an average aggregate particle size (0.4 μm or less) which gives almost transparent washing water (zeolite concentration: 0.013% by weight). In addition, as long as a zeolite has the average primary particle size mentioned above, a desired average aggregate particle size could be obtained without subjecting the zeolite to pulverization treatment. However, as mentioned above, there are no examples of a process for preparing a fine A-type zeolite particle having an average primary particle size of 0.1 μm or less without carrying out pulverization treatment or the like after the reaction for preparing the zeolite.

An object of the present invention is to provide a fine A-type zeolite particle having an average primary particle size of 0.1 μm or less and a variation coefficient of 90% or less, and excellent in the cationic exchange capacity, and giving small amounts of Al eluted in water and little water turbidity in a water-based liquid, a process for preparing the fine A-type zeolite particle, and a detergent composition comprising the fine A-type zeolite particle (hereinafter simply referred to as "fine zeolite particle or fine zeolite particles"), which is very excellent in the detergency and the rinsing performance.

These and other objects of the present invention will be apparent from the following description.

DISCLOSURE OF INVENTION

According to the present invention, there is provided:
(1) A fine A-type zeolite particle having an average primary particle size of 0.1 μm or less and a variation coefficient of 90% or less, wherein a ratio of a peak area above a background level to all peak area in the range of 2θ=20° to 40° in a powder X-ray diffraction spectrum of said fine A-type zeolite particle is 30% or more;
(2) a process for preparing the fine A-type zeolite particle of item (1) above, comprising reacting a silica source with an aluminum source in the presence of an organic compound having an oxygen-containing functional group and a molecular weight of 100 or more; and
(3) a detergent composition comprising a surfactant and the fine A-type zeolite particle of item (1) above.

BEST MODE FOR CARRYING OUT THE INVENTION

The fine zeolite particle of the present invention can be prepared by reacting a silica source with an aluminum source in the presence of an organic compound having an oxygen-containing functional group and a molecular weight of 100 or more. By carrying out the reaction for preparing the zeolite as described above, the crystal growth of the zeolite can be suppressed, whereby a fine A-type zeolite particle having an average primary particle size of 0.1 μm or less can be formed. In the fine zeolite particle obtained as described above, even if the particle were desirably further made smaller by mechanical pulverization or the like until the particle has an average aggregate particle size of 0.4 μm or less which gives substantially transparent washing water (zeolite concentration: 0.013% by weight), the crystallinity degradation, the deterioration of the average primary particle size distribution and the elution of Al (Al ion) can be suppressed.

Specifically, the fine zeolite particle of the present invention is an A-type zeolite having an average primary particle size of 0.1 μm or less and a variation coefficient of 90% or less. The zeolite is excellent in the cationic excellent abilities, and gives substantially no elution of Al ions into water from the zeolite in a water-based liquid containing the zeolite and little water turbidity of the liquid.

The term "water-based liquid" as referred to herein is a liquid comprising certain components and water as a medium including an aqueous solution, a suspension, a dispersion or the like.

The fine zeolite particle of the present invention has an average primary particle size of 0.1 μm or less, preferably 0.08 μm or less, more preferably 0.05 μm or less. As mentioned above, when the average aggregate particle size is made smaller by pulverization from the viewpoint of improving the turbidity of washing water, there arise some problems such as crystallinity degradation of the zeolite. The extent of generation of the problems depends on the average primary particle size of zeolite before pulverization: The larger the average primary particle size, the more serious the problem. Generally, in a A-type zeolite having an average primary particle size larger than 0.1 μm, the primary crystal itself is disintegrated by pulverization, so that the ions of constituent elements are eluted from the zeolite in large amounts and the crystallinity degradation progresses drastically as mentioned above. Since the fine zeolite particle of the present invention has an average primary particle size within the above-mentioned range, the generation of the problems caused by pulverization would be substantially completely suppressed. The average primary particle size can be determined by the method described in Examples set forth below.

The particle size distribution of the zeolite having the average primary particle size in the range mentioned above can be evaluated by variation coefficient. The variation coefficient can be calculated according to the method described in Examples set forth below. The particle size distribution of the fine zeolite particle of the present invention is highly uniform satisfying the variation coefficient of the above-mentioned average primary particle size of 90% or less, preferably 70% or less, more preferably 50% or less, still more preferably 35% or less. In other words, the fine zeolite particle of the present invention is composed of a zeolite having a desired average primary particle size of 0.1 μm or less and a uniform particle size distribution, which contributes to the exhibition of excellent cationic exchange abilities. In an A-type zeolite having a large average primary particle size of 1 μm or more, the state of disintegration of the primary crystals caused by pulverization can be captured by scanning electron microscope, and the variation coefficient of the average primary particle size becomes generally large by the pulverization. On the other hand, in the fine zeolite particle of the present invention, the disintegration of the primary crystals caused by pulverization is substantially completely suppressed, and an aggregate of the primary particles is merely disaggregated during the pulverization. Therefore, the changes in the variation coefficient caused by pulverization do not substantially take place.

The fine zeolite particle of the present invention is an A-type zeolite, which can show substantially the same powder X-ray diffraction pattern as that of a known A-type zeolite (Joint Committee on Powder Diffraction Standards No. 38-241). Here, as long as the powder X-ray diffraction pattern of the fine zeolite particle is substantially the same as that of a known one, the pattern may contain peaks ascribed to other crystalline substances and halo peaks belonging to amorphous substances. In addition, a ratio (powder X-ray diffraction intensity ratio) of a powder X-ray diffraction peak intensity $I_{410}$ of the fine zeolite particle of the present invention to an $I_{410}$ of d=0.3 nm belonging to a plane (410) of a commercially available A-type zeolite (for instance, "TOYOBUILDER" manufactured by Tosoh Corporation) having an average primary particle size of 1 μm or more is preferably 10% or more, more preferably 20% or more, from the viewpoint of improving the cationic exchange abilities.

In addition, the crystallinity of the fine zeolite particle of the present invention can be evaluated by a ratio ($A_r$) of a peak area above the background level in all peak area in the range of 2θ=20° to 40° in the powder X-ray diffraction spectrum. The $A_r$ can be concretely calculated by the method described in Examples set forth below. The fine zeolite particle of the present invention has $A_r$ of 30% or more, preferably 33% or more, within which range the proportion of amorphous portions in the primary crystal structure is small, excellent cationic exchange abilities can be exhibited, and the lowering of the detergency performance due to elution of Al ions can be suppressed.

On the other hand, since the $A_r$ shows the crystallinity of the zeolite, an extent of the crystallinity degradation caused by pulverization can be evaluated as a crystallinity degradation ratio on the basis of $A_r$ obtained before and after the pulverization. The crystallinity degradation ratio can be calculated by the method described in Examples set forth below. In the fine zeolite particle of the present invention, the crystallinity degradation ratio is preferably 50% or less, more preferably 40% or less, still more preferably 35% or less, from the viewpoints of keeping primary crystallinity, thereby suppressing the lowering of cationic exchange abilities and the elution of Al ions.

The fine zeolite particle of the present invention has an average aggregate particle size of preferably 0.4 µm or less, more preferably 0.3 µm or less. The average aggregate particle size can be determined by the method described in Examples set forth below. The degree of turbidity by the fine zeolite particle of the present invention can be also determined as turbidity by the method described in Examples set forth below. When the average aggregate particle size is within the range mentioned above, the turbidity can be preferably 30% or less, more preferably 20% or less. When the average aggregate particle size and the turbidity are within the above ranges, in the case, for instance, where the zeolite is added to a detergent composition such as a laundry powdery detergent and a laundry liquid detergent, it is preferable because the water turbidity of washing water and initial rinsing water is remarkably improved so that the water becomes substantially transparent, and a problem that the zeolite remains on a fiber surface does not also take place.

When the fine zeolite particle does not have an average aggregate particle size of 0.4 µm or less as a primary product obtained by the process for preparing the fine zeolite particle of the present invention described below, the fine zeolite particle may be further subjected to pulverization as described below as desired. As described above, since the fine zeolite particle of the present invention has an average primary particle size of 0.1 µm or less, the lowering of primary crystallinity is small even if subjected to appropriate pulverization to give an average aggregate particle size of 0.4 µm or less. Therefore, substantially no problems on the lowering of cationic exchange abilities and on the elution of Al in large amounts take place. In the present invention, it is preferable that the fine zeolite particle obtained as a primary product is appropriately pulverized, from the viewpoint of further improving the transparency of washing water, when the fine zeolite particle of the present invention is used as a detergent builder.

In addition, when the water-based liquid of the fine zeolite particle of the present invention is prepared, the ratio of the amount of Al eluted in water is preferably less than 4% by weight, more preferably 3.5% by weight or less, still more preferably 3.2% by weight or less, of the entire amount of Al contained in the fine zeolite particle. It is preferable that the proportion of the amount of Al eluted is within the range mentioned above, because in the case where the fine zeolite particle is added to, for instance, a detergent composition, the lowering of qualities (detergency performance, storage stability and the like) of the detergent composition can be suppressed. In addition, the lowering of primary crystallinity and the amount of Al eluted are small even if subjected to appropriate pulverization to give an average aggregate particle size within the desired range. The proportion of the amount of Al eluted in water can be determined by the method described in Examples set forth below.

Also, the fine zeolite particle of the present invention is excellent in the cationic exchange abilities. Here, the term "cationic exchange abilities" refer to both the cationic exchange rate and the cationic exchange capacity. More concretely, the term "cationic exchange rate" refers to an amount of Ca which is ion-exchanged per one gram of a zeolite in one minute, and the term "cationic exchange capacity" refers to an amount of Ca which is ion-exchanged per one gram of a zeolite in ten minutes. The cationic exchange rate and the cationic exchange capacity can be determined by the methods described in Examples set forth below.

The above-mentioned cationic exchange rate (CER) is preferably 180 mg $CaCO_3$/g or more, more preferably 200 mg $CaCO_3$/g or more, still more preferably 220 mg $CaCO_3$/g or more. On the other hand, the above-mentioned cationic exchange capacity (CEC) is preferably 200 mg $CaCO_3$/g or more, more preferably 210 mg $CaCO_3$/g or more, still more preferably 220 mg $CaCO_3$/g or more. It is preferable that the cationic exchange abilities of the fine zeolite particle of the present invention are within the above ranges, because in a case where the zeolite is used for a detergent composition, the detergency performance of the composition is remarkably improved. In addition, there are little crystallinity degradation and deterioration of particle size distribution even if subjected to appropriate pulverization to give an average aggregate particle size within the desired range. Therefore, there are substantially no changes in the cationic exchange abilities.

The fine zeolite particle of the present invention has a composition, in the anhydride form, represented by the general formula $xM_2O \cdot ySiO_2 \cdot Al_2O_3 \cdot zMeO$, wherein M is an alkali metal atom, Me is an alkaline earth atom. In the formula, it is preferable that x is from 0.2 to 4, y is from 0.5 to 6, and z is from 0 to 0.2, and it is more preferable that x is from 0.8 to 2, y is from 1 to 3, and z is from 0.001 to 0.1. Those elements other than the elements given in the above compositional formula can be contained in the composition within the range so as not to lower the cationic exchange abilities. The above-mentioned alkali metal atom refers to those elements belonging to Group IA of the Periodic Table, and is not particularly limited. Among the alkali metal atoms, sodium is preferable. The fine zeolite particle of the present invention can contain two or more alkali metal atoms. In addition, the above-mentioned alkaline earth metal atom refers to those elements belonging to Group IIA of the Periodic Table, and is not particularly limited. Among the alkaline earth metal atoms, calcium and magnesium are preferable. The fine zeolite particle of the present invention can contain two or more alkaline earth metal atoms.

Next, the process for preparing a fine zeolite particle of the present invention will be described. One of the greatest features of the process resides in that a silica source is reacted with an aluminum source in the presence of an organic compound having an oxygen-containing functional group and a molecular weight of 100 or more (hereinafter referred to as "crystallization inhibitor"). Since the reaction is carried out in the presence of the crystallization inhibitor, the flowability of the reaction mixture (slurry) comprising a silica source and an aluminum source is increased, thereby improving the reaction efficiency. At the same time, the crystal growth of the zeolite is suppressed, so that the zeolite particle having small average primary particle size and even particle size distribution can be formed.

The mechanism for suppression of the zeolite crystal growth by the coexistence of the above-mentioned crystallization inhibitor is presumably as follows: Silanol (Si—OH) group or the like on the surface of a zeolite nucleus interacts with oxygen atom of the functional group via a hydrogen bonding-like interaction, so that the zeolite nucleus surface is stabilized, thereby suppressing the crystal growth (Ostwald growth). Also, the zeolite nucleus themselves are sterically repulsed due to the steric hindrance of the crystallization inhibitors adsorbed to (interacting with) the zeolite nucleus, whereby the crystal growth by collision of the zeolite nuclei themselves is inhibited. As a result, a fine zeolite particle having a small average primary particle size is formed.

The silica source and the aluminum source which are used in the process for preparing a fine zeolite particle of the present invention are not particularly limited. For instance, as the silica source, a commercially available water glass can be used, and silica rock, silica sand, cristobalite, kaolin, cullets, and the like can be also used. Further, they may be properly diluted with water or an aqueous alkali metal hydroxide upon use. In addition, as the aluminum source, aluminum-containing compounds such as aluminum hydroxide, aluminum sulfate, and aluminum chloride can be used, and powder or a water-based liquid of an alkali metal aluminate, especially sodium aluminate, is preferably used. These compounds may be commercially available products. As the water-based liquid of sodium aluminate, those obtained by dissolving aluminum hydroxide and an alkali metal hydroxide in water with heating can be used.

The crystallization inhibitor has a molecular weight of 100 or more, preferably 200 or more, more preferably 400 or more. When the molecular weight of the crystallization inhibitor is less than 100, there is little steric hindrance of the crystallization inhibitor adsorbed to (interacting with) the zeolite nucleus surface, so that the progress of the crystal growth by collision of the zeolite nuclei themselves cannot be effectively suppressed, whereby a desired crystallization inhibiting effect cannot be obtained. In addition, the molecular weight of the crystallization inhibitor is preferably 60000 or less, more preferably 30000 or less, still more preferably 10000 or less, within which range the crystallization inhibitor is sufficiently dissolved in the reaction mixture comprising a silica source and an aluminum source, so that the amount of the crystallization inhibitor adsorbed to the zeolite nucleus (amount of the crystallization inhibitor interacting with the zeolite nucleus) is increased, whereby a crystallization inhibiting effect is sufficiently exhibited. Especially, the crystallization inhibitor has a molecular weight of preferably from 100 to 60000, more preferably from 200 to 30000, still more preferably from 400 to 10000. In the present invention, when the crystallization inhibitor has one or more hydroxyl groups or one or more carboxyl groups at one end or both ends, the molecular weight of the crystallization inhibitor can be determined by quantitative analysis of functional groups, for instance, the analysis of hydroxyl value or acid value. In addition, for instance, when the molecular weight is 1000 or more, the molecular weight is a weight-average molecular weight, which can be determined by GPC (gel permeation chromatography) in accordance with a known method.

The functional group of the crystallization inhibitor is not particularly limited, as long as it contains oxygen atom. The preferable oxygen-containing functional group includes, for instance, OR group, COOR group, $SO_3R$ group, $PO_4R$ group, CO group, CONH group, and the like, among which OR group and/or COOR group is more preferable. R is at least one member selected from a saturated or unsaturated organic group having 1 to 22 carbon atoms, hydrogen atom and an alkali metal atom. The saturated or unsaturated organic group having 1 to 22 carbon atoms includes, for instance, ethylene group, vinyl group, phenyl group, hexyl group, dodecyl group, and the like. The alkali metal atom includes, for instance, sodium, potassium, and the like.

These functional groups may construct a main chain, or they may construct a side chain. The number of functional groups per one molecule of the crystallization inhibitor is not particularly limited. The number of functional groups per one molecule is preferably 2 or more, more preferably 3 or more, still more preferably 4 or more. It is preferable that the number of functional groups per one molecule is within the above range, from the viewpoint of giving a sufficient number of interaction site of the zeolite nucleus and the crystallization inhibitor, thereby giving an excellent crystallization inhibiting effect of the zeolite. In addition, the number of functional groups per one molecule is preferably 1000 or less, more preferably 500 or less, still more preferably 200 or less. It is preferable that the number of functional groups per one molecule is within the above range, from the viewpoints of giving appropriate molecular weight of the crystallization inhibitor for sufficiently dissolving the compound in a reaction mixture, whereby exhibiting an excellent crystallization inhibiting effect.

Concrete examples of the crystallization inhibitor include nonionic surfactants such as polyoxyethylene lauryl ether; and water-soluble polymers such as polyethylene glycol, polyvinyl alcohols, acrylate-based polymers, carboxymethyl cellulose and hexametaphosphate; and the like, without being limited thereto. These compounds can be used as a mixture of two or more kinds.

The feeding composition for preparing the fine zeolite particle of the present invention, as expressed by an $SiO_2/Al_2O_3$ molar ratio, is preferably 0.5 or more, more preferably 1 or more, still more preferably 1.5 or more. It is preferable that the $SiO_2/Al_2O_3$ molar ratio is within the above range, from the viewpoints of stabilizing the crystal structure of the zeolite, thereby suppressing the lowering of crystallinity, and accelerating the progress of crystallization. In addition, the $SiO_2/Al_2O_3$ molar ratio is preferably 4 or less, more preferably 3 or less, still more preferably 2.5 or less. It is preferable that the $SiO_2/Al_2O_3$ molar ratio is within the above range, from the viewpoints of favorably progressing the reaction, thereby giving sufficient cationic exchange abilities.

Also, the feeding composition of the compound containing an alkali metal, as expressed by an $M_2O/Al_2O_3$ molar ratio, the alkali metal (M) being shown as an oxide, is preferably 0.08 or more, more preferably 0.8 or more, still more preferably 1.4 or more. It is preferable that the $M_2O/Al_2O_3$ molar ratio is within the above range, from the viewpoint of accelerating the progress of crystallization. In addition, the $M_2O/Al_2O_3$ molar ratio is preferably 20 or less, more preferably 5 or less, still more preferably 3 or less. It is preferable that the $M_2O/Al_2O_3$ molar ratio is within the above range, from the viewpoint of favorable productivity.

Further, the feeding composition of the compound containing an alkali metal and water in the reaction system, as expressed by an $M_2O/H_2O$ molar ratio, is preferably 0.02 or more, more preferably 0.05 or more, still more preferably 0.07 or more. It is preferable that the $M_2O/H_2O$ molar ratio is within the above range, from the viewpoint of giving an appropriate crystallization rate, thereby favorably progressing the formation of the fine zeolite particle with small average primary particle size. In addition, the $M_2O/H_2O$ molar ratio is preferably 0.2 or less, more preferably 0.15 or less, still more preferably 0.1 or less. It is preferable that the $M_2O/H_2O$ molar ratio is within the above range, from the viewpoint of properly progressing the reaction, thereby giving sufficient cationic exchange abilities.

Furthermore, the feeding composition of the compound containing an alkaline earth metal, as expressed by an MeO/Al$_2$O$_3$ molar ratio, the alkaline earth metal (Me) being shown as an oxide, is preferably 0 to 0.1. The MeO/Al$_2$O$_3$ molar ratio is more preferably 0.005 or more, still more preferably 0.01 or more, from the viewpoints of accelerating making the average primary particle size fine and improving thermal stability. In addition, the MeO/Al$_2$O$_3$ molar ratio is preferably 0.1 or less, more preferably 0.08 or less, still more preferably 0.05 or less, from the viewpoint of improving the ion exchange abilities.

Moreover, the feeding composition of the aluminum in the reaction system, as expressed by an Al$_2$O$_3$/H$_2$O molar ratio, is preferably 0.01 or more, more preferably 0.02 or more, still more preferably 0.03 or more. It is preferable that the Al$_2$O$_3$/H$_2$O molar ratio is within the above range, from the viewpoints of excellent productivity and acceleration of making the average primary particle size fine. In addition, the Al$_2$O$_3$/H$_2$O molar ratio is preferably 0.25 or less, more preferably 0.2 or less, still more preferably 0.1 or less. It is preferable that the Al$_2$O$_3$/H$_2$O molar ratio is within the above range, from the viewpoint of giving an excellent flowability to the slurry, thereby efficiently progressing the reaction.

When the solid content is defined as a total weight of each inorganic element contained in the raw materials used constituting the fine zeolite particle of the present invention calculated as an oxide, and the concentration of the solid content during the reaction is defined as the concentration of the solid content in the entire water-containing slurry, the concentration of the solid content is preferably 10% by weight or more, more preferably 20% by weight or more, still more preferably 30% by weight or more, from the viewpoint of productivity In addition, the concentration of the solid content is preferably 70% by weight or less, more preferably 60% by weight or less, still more preferably 50% by weight or less, from the viewpoint of the flowability of the slurry.

On the other hand, the feeding amount of the above-mentioned crystallization inhibitor is preferably 1% by weight or more, more preferably 5% by weight or more, still more preferably 10% by weight or more, in the reaction mixture comprising a silica source and an aluminum source, from the viewpoint of exhibiting a crystallization inhibiting effect. In addition, the feeding amount of the above-mentioned crystallization inhibitor is preferably 80% by weight or less, more preferably 60% by weight or less, still more preferably 50% by weight or less, from the viewpoint of productivity.

The fine zeolite particle of the present invention is, for instance, prepared by feeding a silica source, an aluminum source and a crystallization inhibitor each in a separate vessel, and properly mixing these components in accordance with a known method to react the components. During the reaction, other components may be added within the range so as not to hinder the preparation of the fine zeolite particle of the present invention. Such other components include, for instance, calcium chloride, magnesium chloride and the like. It is preferable that each of the silica source, the aluminum source and the crystallization inhibitor is fed to the reaction in the form of water-based liquid, from the viewpoint of homogeneously and efficiently carrying out the reaction.

The mixing order of the silica source, the aluminum source and the crystallization inhibitor is not particularly limited. A liquid mixture of the aluminum source and the crystallization inhibitor may be mixed with the silica source, or a liquid mixture of the silica source and the crystallization inhibitor may be mixed with the aluminum source. Alternatively, the silica source and the aluminum source may be simultaneously fed to the crystallization inhibitor, and mixed; or the crystallization inhibitor may be previously mixed with the silica source and/or the aluminum source, and the silica source is then mixed with the aluminum source.

In addition, the mixing method is not particularly limited. For instance, the silica source, the aluminum source and the crystallization inhibitor may be subjected to line-mixing, with circulating the silica source, the aluminum source and the crystallization inhibitor together in a specified circulation line. Alternatively, the silica source, the aluminum source and the crystallization inhibitor may be mixed in a reaction vessel (batch-type mixing). The reaction time is not particularly limited because it depends upon the reaction temperature. The reaction time is preferably 30 seconds or more, more preferably 1 minute or more, still more preferably 5 minutes or more, from the termination of adding all the feeding components, from the viewpoint of the homogeneity of reaction. Also, the reaction time is preferably 120 minutes or less, more preferably 60 minutes or less, still more preferably 30 minutes or less, from the viewpoint of productivity.

The reaction temperature is preferably 10° C. or more, more preferably 20° C. or more, still more preferably 40° C. or more. It is preferable that the reaction temperature is within the range specified above, from the viewpoints of giving excellent flowability of the reaction mixture and carrying out homogeneous reaction. Also, the reaction temperature is preferably 100° C. or less, more preferably 90° C. or less, still more preferably 80° C. or less. It is preferable that the reaction temperature is within the range specified above, from the viewpoints of proper energy load and an economical advantage on an industrial scale.

The crystallization can be carried out by aging the reaction mixture after the reaction at a temperature equal to or higher than the reaction temperature under stirring. The aging temperature is not particularly limited. The aging temperature is preferably 50° C. or more, more preferably 70° C. or more, still more preferably 80° C. or more, from the viewpoint of the crystallization rate. In addition, the aging temperature is preferably 120° C. or less, more preferably 100° C. or less, still more preferably 90° C. or less, from the viewpoints of energy load and pressure resistance of the reaction vessel. Although the aging time depends upon the aging temperature, the aging time is preferably 1 minute or more, more preferably 10 minutes or more, still more preferably 30 minutes or more, from the viewpoint of sufficiently carrying out the crystallization. In addition, the aging time is preferably 300 minutes or less, more preferably 180 minutes or less, still more preferably 120 minutes or less, from the viewpoints of the lowering of cationic exchange abilities caused by by-product reaction of sodalite and the productivity.

After the termination of aging, the crystallization is terminated by cooling, diluting or filtering and washing the slurry, or neutralizing the slurry by adding an acid. In the case of filtering and washing the slurry, it is preferable that washing is carried out until pH of the washing preferably becomes 12 or less. Also, in the case of neutralizing the slurry, the acid used for the neutralization is not particularly limited, and sulfuric acid, hydrochloric acid, nitric acid, carbon dioxide gas, oxalic acid, citric acid, tartaric acid, fumaric acid, succinic acid and the like can be used. Sulfuric acid and carbon dioxide gas are preferable, from the viewpoints of preventing corrosion of the devices and lowering costs. It is preferable that the pH of the slurry is adjusted to 8 to 12. After the termination of the crystallization, the fine zeolite particle of the present invention in the form of slurry is obtained. Further, this slurry may be appropriately subjected to filtration or centrifugation to separate zeolite precipitates, and the precipitates are further washed and dried into the form of cake or powder.

Next, the fine zeolite particle obtained as a primary product may be pulverized as desired, from the viewpoint of adjusting the zeolite particle to show a desired average aggregate particle size. The pulverization may be carried out by directly subjecting the slurry of the above-mentioned fine zeolite particle to wet pulverization, or alternatively re-dispersing the resulting fine zeolite particle in a solvent, and thereafter subjecting the dispersion to wet pulverization, or alternatively subjecting a powdery fine zeolite particle to dry pulverization. Each of the pulverization methods can be carried out in accordance with a known method.

For instance, when the fine zeolite particle of the present invention is added to the detergent composition of the present invention described below, the zeolite particle may be added in a slurry form. In this case, it is preferable to carry out wet pulverization, from the viewpoint of simplicity in the preparation steps. The pulverization method employed herein is not particularly limited. For instance, there may be employed pulverizers and the like described in *Kagaku Kogakukai* Edited, *Kagaku Kogaku Binran* (published by Maruzen Publishing, 1988), *Fifth Edition,* pages 826 to 838. Also, the dispersion medium to be used for wet pulverization includes water, alcohol solvents such as ethanol, surfactants such as polyoxyethylene alkyl ethers, polymer dispersants, and the like. They can be used alone or as a mixed solution of two or more kinds. When the slurry is subjected to wet pulverization, the zeolite concentration in the slurry is preferably 5% by weight or more, more preferably 10% by weight or more, still more preferably 15% by weight or more, from the viewpoint of productivity. In addition, the zeolite concentration in the slurry is preferably 60% by weight or less, more preferably 55% by weight or less, still more preferably 50% by weight or less, from the viewpoint of the handleability of the zeolite slurry during the wet pulverization and from the viewpoint of prevention of the re-aggregation of the fine zeolite particle after pulverization.

The fine zeolite particle of the present invention is suitably used for, for instance, detergent builders, water treatment agents, fillers for paper, resin fillers, oxygen-nitrogen separating agents, adsorbents, catalyst carriers, soil improvers for gardening, polishing agents, and the like, and especially preferably used as detergent builders.

Further, the detergent composition of the present invention will be described. The detergent composition comprises a surfactant and the fine zeolite particle of the present invention. Owing to the high cationic exchange abilities, the low Al ion-eluting property and further the low turbidity of the zeolite, the detergent composition exhibits excellent detergency performance and makes rinsing water substantially not turbid, so that the amount of water and the time required for rinsing can be remarkably shortened.

The content of the fine zeolite particle in the detergent composition of the present invention is not particularly limited. The content of the fine zeolite particle in the detergent composition is preferably 1% by weight or more, more preferably 3% by weight or more, still more preferably 5% by weight or more, from the viewpoint of exhibiting satisfactory detergency performance. In addition, the content of the fine zeolite particle is preferably 60% by weight or less, more preferably 50% by weight or less, still more preferably 40% by weight or less, from the viewpoint of stability in the production of the detergent composition. The content of the fine zeolite particle in the detergent composition is preferably from 1 to 60% by weight, more preferably from 3 to 50% by weight, still more preferably from 5 to 40% by weight. In addition, in the detergent composition of the present invention, there may be formulated other known zeolites together with the fine zeolite particle of the present invention. Such other zeolites may be commercially available zeolites, and the crystal structure of such zeolites may be P-type, X-type and the like other than the A-type. Also, the zeolites may be a mixture of two or more of these zeolites. The average primary particle size and the average aggregate particle size of the other zeolite are not particularly limited. The average primary particle size is preferably 10 μm or less, more preferably 5 μm or less, still more preferably 2 μm or less, from the viewpoint of the cationic exchange rate. Also, the average aggregate particle size is preferably 15 μm or less, more preferably 10 μm or less, still more preferably 5 μm or less, from the viewpoint of the dispersibility in water. The proportion of the fine zeolite particle of the present invention contained in all the zeolite used is preferably 10% by weight or more, more preferably 20% by weight or more, still more preferably 50% by weight or more, from the viewpoint of securing the exhibition of the desired effect of the detergent composition of the present invention.

The surfactant to be added to the detergent composition of the present invention is not particularly limited. For instance, there can be exemplified nonionic, anionic, cationic and amphoteric surfactants.

Concrete examples of the nonionic surfactants include those known nonionic surfactants disclosed in "Chapter 3, Section 1 of *Shuchi•Kanyo Gijutsushu* (*Iryoyo Funmatsusenzai*) [Known and Well Used Technical Terminologies (Laundry Powder Detergent)]" a publication made by the Japanese Patent Office. Other nonionic surfactants include polyoxyethylene alkyl phenyl ethers, polyoxyethylene alkylamines, sucrose fatty acid esters, glycerol fatty acid monoesters, higher fatty acid alkanolamides, polyoxyethylene higher fatty acid alkanolamides, amine oxides, alkyl glycosides, alkyl glyceryl ethers, N-alkyl gluconamides and the like.

Examples of the anionic surfactants include those known anionic surfactants disclosed in "Chapter 3, Section 1 of *Shuchi•Kanyo Gijutsushu* (*Iryoyo Funmatsusenzai*) [Known and Well Used Technical Terminologies (Laundry Powder Detergent)]" a publication made by the Japanese Patent Office. The counter ions for the anionic surfactant are selected from the group consisting of sodium ion, potassium ion, magnesium ion, calcium ion, a cation formed by protonating an amine such as ethanolamines, a quaternary ammonium salt, and mixtures thereof.

Examples of the cationic surfactants include those known cationic surfactants disclosed in "Chapter 3, Section 1 of *Shuchi•Kanyo Gijutsushu* (*Iryoyo Funmatsusenzai*) [Known and Well Used Technical Terminologies (Laundry Powder Detergent)]" a publication made by the Japanese Patent Office.

Examples of the amphoteric surfactants include those known amphoteric surfactants disclosed in "Chapter 3, Section 1 of *Shuchi•Kanyo Gijutsushu* (*Iryoyo Funmatsusenzai*) [Known and Well Used Technical Terminologies (Laundry Powder Detergent)]" a publication made by the Japanese Patent Office.

The above-mentioned surfactants can be used alone or in admixture of two or more kinds. In addition, the surfactants can be selected from those of the same or different kinds.

The content of the surfactant in the detergent composition of the present invention is not particularly limited. The content of the surfactant in the detergent composition is preferably 1% by weight or more, more preferably 5% by weight or more, still more preferably 10% by weight or more, from the viewpoint of detergency. Also, the content of the surfactant is preferably 90% by weight or less, more preferably 70% by weight or less, still more preferably 60% by weight or less, from the viewpoint of the productivity of the detergent composition. The content of the surfactant in the detergent composition of the present invention is preferably from 1 to 90% by weight, more preferably from 5 to 70% by weight, still more preferably from 10 to 60% by weight.

In the detergent composition of the present invention, besides the above-mentioned surfactant and the fine zeolite particle of the present invention, there can be properly added various additives which are usually added to laundry detergents. The content of these additives can be properly adjusted as long as they do not inhibit the desired effects of the detergent composition of the present invention.

The above-mentioned additives include, for instance, other inorganic builders, organic builders, enzymes, re-deposition preventives, fluorescers, viscosity-controlling agents, solvents, bleaching agents, dispersing agents, perfume, and the like. The inorganic builder besides the zeolite includes silicates, carbonates, sulfates, sulfites, condensed phosphates, sodium chloride, and the like, and these salts are preferably formed with an alkali metal. The organic builder includes organic alkalizing agents such as alkanolamines such as triethanolamine, diethanolamine and monoethanolamine; organic cation-exchanging agents such as aminopolyacetates such as ethylenediaminetetraacetate, oxycarboxylates such as citric acid, polycarboxylates such as polyacrylic acids and acrylic acid-maleic acid copolymers, and the like, and these salts are preferably formed with an alkali metal or ammonium. The enzyme includes cellulase, amylase, cannase, lipase, protease, and the like. The re-deposition agent includes polyethylene glycol, polyvinyl alcohol, polyvinyl pyrrolidone, carboxymethyl cellulose, and the like. The viscosity-controlling agent and the solvent include lower alcohols such as isopropanol, glycols such as ethylene glycol, glycerol, and the like. The bleaching agent includes inorganic peroxide bleaching agents such as sodium percarbonate and sodium perborate, or a mixture of these inorganic peroxide bleaching agents with a bleaching activator. Examples of the bleaching activator include an organic compound having a reactive acyl group for forming an organic peroxide. Concrete examples of the bleaching activator include sodium lauroyloxybenzenesulfonate, sodium decanoyloxybenzenesulfonate, lauroyloxybenzoic acid, decanoyloxybenzoic acid and the like. Besides them, bleaching activating catalysts such as manganese, cobalt and iron complexes can be added as a bleaching activator.

The detergent composition of the present invention can be obtained by mixing and stirring each of the components mentioned above according to a known method, and thereafter optionally subjecting the resulting mixture to such a treatment as granulation. Since the composition comprises the fine zeolite particle of the present invention, the composition is very excellent in the detergency and the rinsing performance. The detergency and the rinsing performance can be evaluated by the methods described in Examples set forth below.

The determination values of the sample properties in Examples and Comparative examples were measured according to the method set forth below. Here, "%" means "% by weight" unless otherwise noted. In the table, the units for the cationic exchange abilities are each simply expressed as "mg/g."

(1) Average Primary Particle Size

The primary particle size of zeolite particle for 100 or more particles is measured by a digitizer (commercially available from GRAPHTEC CORPORATION, "DIGITIZER KW3300"), on the basis of the scanning electron photomicrographs of a sample zeolite taken by a field-emission high resolution scanning electron microscope (FE-SEM, commercially available from Hitachi Ltd., S-4000). The number-average value (average primary particle size) and the variation coefficient (%) are calculated on the basis of the entire resulting determination values as population. Here, the variation coefficient is calculated by the following equation:

$$\text{Variation Coefficient (\%)} = \frac{\text{Standard Deviation (μm)}}{\text{Average Primary Particle Size (μm)}} \times 100$$

(2) Powder X-ray Diffraction

The powder sample is subjected to powder X-ray diffraction at room temperature (20° C.) by using a powder X-ray diffractometer, commercially available from Rigaku Denki, "RINT 2500 VPC" (light source: CuKα ray, tube voltage: 40 kV, and tube electric current: 120 mA) under the conditions of a scanning interval of 0.01° in the range of 2θ=5° to 40°, a scanning speed of 10°/minute, a divergence vertical limiting slit of 10 mm, a divergence slit of 1°, a light-intercepting slit of 0.3 mm, and a scattering slit being automatic. With taking background level points at 2θ=20°, 28.5°, 37° and 40°, a background curve is drawn by third-order polynomial, and a peak area $A_{peak}$, an area formed between the diffraction curve in the range of 2θ=20° to 40° and the background curve is determined. $A_r$, which is a proportion of a peak area ($A_{peak}$) above the background level in all peak area ($A_{all}$) in the range of 2θ=20° to 40° is calculated from the peak area and all the peak area as follows:

$$A_r\ (\%) = \frac{A_{peak}}{A_{all}} \times 100$$

The term "all peak area" refers to an area formed between the diffraction curve in the range of 2θ=20° to 40° and a straight line of intensity zero. In addition, the crystallinity degradation ratio by pulverization is calculated by the following equation:

$$\text{Crystallinity Degradation Ratio (\%)} = \frac{1-(A_r\ \text{of Zeolite After Pulverization})}{(A_r\ \text{of Zeolite Before Pulverization})} \times 100$$

Further, the powder X-ray diffraction intensity ratio (%) is calculated as a ratio of a powder X-ray diffraction peak intensity ($I_{410}$) having a face distance d=0.3 nm belonging to a face ($I_{410}$) of A-type zeolite obtained for the zeolite to be analyzed to $I_{410}$ of a commercially available A-type zeolite ("TOYOBUILDER," commercially available from TOSOH CORPORATION, $I_{410}$=32837 cps) having an average primary particle size of 1 μm or more.

(3) Average Aggregate Particle Size

The particle size distribution is measured with a slurry prepared by dispersing a sample in water as a dispersion medium under conditions of a refractive index of 1.2, an ultrasonic intensity of 7, an ultrasonication irradiation time of 1 minute, and a flow rate of 4, using a laser diffraction/scattering particle size distribution analyzer (commercially available from HORIBA Ltd., LA-920). The median diameter (calculated on the basis of volume) obtained is considered as an average aggregate particle size ($\mu$m).

(4) Cationic Exchange Capacity

The amount 0.2 g of a water-based liquid of 20% zeolite is added to 100 mL of an aqueous calcium chloride (100 ppm calcium concentration, calculated as $CaCO_3$), and stirred at 20° C. for 1 minute or 10 minutes, and the mixture is filtered with a disposable filter with 0.2 $\mu$m pore size. Thereafter, 10 mL of the resulting filtrate is taken and assayed for a Ca content in the filtrate by using a photometric titration apparatus, and cationic exchange abilities are determined. Incidentally, the Ca content (calculated as the amount of $CaCO_3$) ion-exchanged per 1 g of the zeolite in 1 minute is referred to as "cationic exchange rate (CER, expressed as mg $CaCO_3$/g)", and the Ca content (calculated as the amount of $CaCO_3$) ion-exchanged per 1 g of the zeolite in 10 minutes is referred to as "cationic exchange capacity (CEC, expressed as mg $CaCO_3$/g)."

(5) Turbidity

The turbidity (%) of a water-based liquid of zeolite (zeolite concentration: 0.013%) prepared by stirring the zeolite in water having water hardness of 4° at room temperature (20° C.) for 10 minutes is determined by using a turbidimeter commercially available from Murakami Color Research Laboratory, reflectance-transmittance meter HR-100.

(6) Detergency

Forty grams of a crystalline silicate (KWS-2, particle size: 11 $\mu$m, commercially available from Kao Corporation) is added to a mixed solution of 24.8 g of a nonionic surfactant (EMULGEN 108, commercially available from Kao Corporation), 14.8 g of a polyoxyethylene phenyl ether (commercially available from Nippon Nyukazai) and 0.4 g of a polymer-type dispersant (AQUALOCK FC 600S, commercially available from NIPPON SHOKUBAI CO., LTD.), and the resulting mixture is homogeneously mixed with stirring. The resulting silicate-containing liquid mixture is placed in a 1-L batch-type sand-mill (commercially available from IMEX) together with 500 g of zirconia beads (diameter: 1 mm), and subjected to pulverization at a disc rotational speed of 1500 rpm for 60 minutes. Next, 0.3333 g of a liquid mixture containing the silicate after the pulverization (particle size: 2.3 $\mu$m) and 0.3333 g of a water-based liquid of zeolite (zeolite concentration: 20%) are mixed, to give a detergent composition. Five pieces of artificially soiled cloths are washed by washing with the resulting detergent composition for 10 minutes, rinsing for 1 minute and drying using a turg-O-meter (120 rpm, commercially available from Ueshima Seisakusho) in 1 L of water having water hardness of 4° at a water temperature of 20° C., and the deterging rate (%) is determined. Here, the deterging rate is determined by measuring the reflectances at 550 nm of an unsoiled cloth and the artificially soiled cloth before and after washing by an automatic recording calorimeter (commercially available from Shimadzu Corporation), and calculated by the following equation.

$$\text{Deterging Rate (\%)} = \frac{[\text{Reflectance After Washing} - \text{Reflectance Before Washing}]}{[\text{Reflectance of Unsoiled Cloth} - \text{Reflectance Before Washing}]} \times 100$$

The deterging rate is obtained as an average of 5 pieces of cloths.

The artificially soiled cloths described above are prepared by smearing a cloth (#2003 calico, commercially available from Tanigashira Shoten) with an artificial soil solution having the following composition. The smearing of the cloths with the artificial soil solution is carried out using a gravure roll coater (cell capacity: 58 cm, coating speed: 1 m/minute, drying temperature: 100° C., and drying time: 1 minute) made in accordance with Japanese Patent Laid-Open No. Hei 7-270395.

(Composition of Artificial Soil Solution)

The composition of the artificial soil solution is as follows: Lauric acid: 0.44%, myristic acid: 3.09%, pentadecanoic acid: 2.31%, palmitic acid: 6.18%, heptadecanoic acid: 0.44%, stearic acid: 1.57%, oleic acid: 7.75%, triolein: 13.06 /o, n-hexadecyl palmitate: 2.18%, squalene: 6.53%, liquid crystalline product of lecithin, from egg yolk (commercially available from Wako Pure Chemical Industries): 1.94%, Kanuma red clay for gardening: 8.11%, carbon black (commercially available from Asahi Carbon.): 0.01%, and tap water: balance.

(7) Rinsing Performance

Using a detergent composition prepared by mixing a zeolite 22%, a crystalline silicate (SKS-6, particle size: 26 $\mu$m, commercially available from Clariant) 11%, and a nonionic surfactant (EMULGEN 108, commercially available from Kao Corporation) 67%, the clothes are washed for 10 minutes under the conditions of a liquor ratio of 1/20, a concentration of the detergent composition of 20 g/30 L, and a water temperature of 20° C. in tap water having water hardness of 4°, and then rinsed for 4 minutes at a rinsing flow rate of 15 L/minute, using a twin-tub washing machine commercially available from TOSHIBA CORPORATION, "GINGA 3.6". Thereafter, the transparency of the rinsing is visually confirmed, and the rinsing performance is evaluated on the basis of the following evaluation criteria. Specifically, after the clothes in the washtub are moved to the side wall of the washtub after stopping the washing machine, the rinsing performance is evaluated on the basis of the 3 grade-evaluation criteria:

○: the case where the rinsing is transparent, and the pulsator at the bottom of the washtub is clearly seen;

Δ: the case where the rinsing is slightly turbid, but the pulsator can be seen; and ×: the case where the rinsing is turbid and the contour of the pulsator cannot be clearly seen.

EXAMPLE 1

(1) Preparation of Zeolite

Two-hundred grams of a nonionic surfactant (compound name: polyoxyethylene lauryl ether, EMULGEN 108, commercially available from Kao Corporation) was added to 400 g of an aqueous sodium aluminate solution ($Na_2O$: 21.01%, $Al_2O_3$: 28.18%) contained in a 2 L-stainless container, while stirring with Teflon agitation blades each having a length of 11 cm at 400 rpm. The resulting mixture was heated at 50° C. for 20 minutes using a mantle heater. The amount 445 g of No. 3 water glass ($Na_2O$: 9.68%, $SiO_2$: 29.83%, commercially available from Osaka Keiso) was added dropwise to the resulting solution over 5 minutes using a roller pump.

After the termination of the dropwise addition, the mixture was further stirred for 10 minutes (400 rpm), and heated to 80° C. over 30 minutes while stirring. Thereafter, the mixture was further aged for 60 minutes. The resulting water-based liquid of fine zeolite particles was filtered, and washed with water until the filtrate had a pH of less than 12. The filtrate was dried at 100° C. for 13 hours, and crushed for 1 minute with a cooking cutter. The resulting powder was subjected to powder X-ray diffraction measurement. As a result, it was confirmed that A-type zeolite (powder X-ray diffraction intensity ratio: 46%) was formed. In addition, the average primary particle size of the zeolite particles was 0.03 μm.

(2) Pulverization of Zeolite

A water-based liquid of zeolite prepared by dispersing 10 g of the resulting powder of fine A-type zeolite particles in 40 g of ion-exchanged water was placed in a sealed container (capacity: 250 mL, made of polystyrene) together with 300 g of zirconia balls having a diameter of 5 mm, and pulverized with a ball-mill (300 rpm) for 24 hours. The concentration of Al eluted in the filtrate, obtained by ultrafiltering the water-based liquid of zeolite after the pulverization (zeolite concentration: 20%) with Ultrafilter Unit USY-1, molecular weight cut off: 10000, commercially available from ADVANTEC, was quantified by ICP (Inductively coupled plasma spectrometry) analysis. The concentration of the total Al contained in the zeolite in the water-based liquid of 20% zeolite was 3% of the liquid, and the concentration of eluted Al obtained by the ICP analysis was 900 ppm. The proportion of the amount of the eluted Al in the amount of the total Al was found to be 3%. Incidentally, the proportion of the amount of eluted Al of the zeolite obtained in the above item (1) without pulverization was also determined in the same manner as above.

Also, various properties of the zeolite before and after the pulverization were determined in the manner as described above. Incidentally, the zeolite after the pulverization was evaluated using those obtained by drying the filtered precipitates, which were obtained during the determination of the amount of the eluted Al, at 100° C. for 13 hours. In addition, the cationic exchange abilities, the turbidity, the deterging rate, and the rinsing performance were evaluated using the zeolite after the pulverization.

EXAMPLE 2

(1) Preparation of Zeolite

The amount 137 g of a polyethylene glycol (PEG 600, average molecular weight: 600, commercially available from Wako Pure Chemical Industries) was added to 400 g of an aqueous sodium aluminate solution ($Na_2O$: 21.01%, $Al_2O_3$: 28.18%) contained in a 2 L-stainless container, while stirring with Teflon agitation blades each having a length of 11 cm at 400 rpm. The resulting mixture was heated at 50° C. for 20 minutes using a mantle heater. The amount 445 g of No. 3 water glass ($Na_2O$: 9.68%, $SiO_2$: 29.83%, commercially available from Osaka Keiso) was added dropwise to the resulting solution over 5 minutes using a roller pump. After the termination of the dropwise addition, the mixture was further stirred for 10 minutes (400 rpm), and heated to 80° C. over 30 minutes, while stirring. Thereafter, the mixture was further aged for 60 minutes. The resulting water-based liquid of fine zeolite particles was filtered, and washed with water until the filtrate had a pH of less than 12. The filtrate was dried at 100° C. for 13 hours, and crushed for 1 minute with a cooking cutter. The resulting powder was subjected to powder X-ray diffraction measurement. As a result, it was confirmed that A-type zeolite (powder X-ray diffraction intensity ratio: 48%) was formed. In addition, the average primary particle size of the zeolite particles was 0.03 μm.

(2) Pulverization of Zeolite

A water-based liquid of zeolite prepared by dispersing 16 g of the resulting powder of fine A-type zeolite particles in 64 g of ion-exchanged water was placed in a pulverizing vessel made of Teflon together with 500 g of zirconia beads having a diameter of 0.5 mm, and a sand-mill pulverization was carried out at 1500 rpm for 20 minutes. The concentration of Al eluted in the filtrate, obtained by ultrafiltering the water-based liquid of zeolite after the pulverization (zeolite concentration: 20%) with Ultrafilter Unit USY-1, molecular weight cut off: 10000, commercially available from ADVANTEC, was quantified by ICP analysis. The concentration of the total Al contained in the zeolite in the water-based liquid of 20% zeolite was 3% of the liquid, and the concentration of eluted Al obtained by the ICP analysis was 700 ppm. The proportion of the amount of the eluted Al in the amount of the total Al was found to be 2.3%. In addition, various properties of the zeolite were determined in the same manner as in Example 1.

EXAMPLE 3

(1) Preparation of Zeolite

Two-hundred grams of a sodium aluminate powder ($Na_2O$: 40.1%, $Al_2O_3$: 53.8%, NAP-120, commercially available from Sumitomo Chemical Company, Limited) was added to 147 g of a 40% aqueous acrylate polymer solution (Oligomer D, weight-average molecular weight: 10000, commercially available from Kao Corporation) contained in a 2 L-stainless container, while stirring with Teflon agitation blades each having a length of 11 cm at 400 rpm. The resulting mixture was heated at 50° C. for 20 minutes using a mantle heater. The amount 428 g of No. 3 water glass ($Na_2O$: 9.68%, $SiO_2$: 29.83%, commercially available from Osaka Keiso) was added dropwise to the resulting solution over 5 minutes using a roller pump. After the termination of the dropwise addition, the mixture was further stirred for 10 minutes (400 rpm), and heated to 80° C. over 30 minutes while stirring. Thereafter, the mixture was further aged for 60 minutes. The resulting water-based liquid of fine zeolite particles was filtered, and washed with water until the filtrate had a pH of less than 12. The filtrate was dried at 100° C. for 13 hours, and crushed for 1 minute with a cooking cutter. The resulting powder was subjected to powder X-ray diffraction measurement. As a result, it was confirmed that A-type zeolite (powder X-ray diffraction intensity ratio: 49%) was formed. In addition, the average primary particle size of the zeolite particles was 0.03 μm.

(2) Pulverization of Zeolite

A water-based liquid of zeolite prepared by dispersing 10 g of the resulting powder of fine A-type zeolite particles in 40 g of ion-exchanged water was placed in a sealed container (capacity: 250 mL, made of polystyrene) together with 300 g of zirconia balls having a diameter of 5 mm, and a ball-mill pulverization was carried out at 300 rpm for 24 hours. The concentration of Al eluted in the filtrate obtained by ultrafiltering the water-based liquid of zeolite after the pulverization (zeolite concentration: 20%) with Ultrafilter Unit USY-1, molecular weight cut off: 10000, commercially available from ADVANTEC, was quantified by ICP analysis. The concentration of the total Al contained in the zeolite in the water-based liquid of 20% zeolite was 3% of the liquid, and the concentration of eluted Al obtained by the ICP analysis was 700 ppm. The proportion of the amount of the eluted Al in the amount of the total Al was found to be 2.3%. In addition, various properties of the zeolite were determined in the same manner as in Example 1.

Comparative Example 1

(1) Preparation of Zeolite

The amount 211 g of an aqueous sodium hydroxide (48% aqueous NaOH) was added to 400 g of an aqueous sodium aluminate solution ($Na_2O$: 21.01%, $Al_2O_3$: 28.18%) contained in a 2 L-stainless container, while stirring with Teflon agitation blades each having a length of 11 cm at 400 rpm. The resulting mixture was heated at 50° C. for 20 minutes using a mantle heater. A mixed solution of 445 g of No. 3 water glass ($Na_2O$: 9.68%, $SiO_2$: 29.83%, commercially available from Osaka Keiso) and 236 g of an aqueous calcium chloride (1% aqueous $CaCl_2$) was added dropwise to the resulting solution over 5 minutes using a roller pump. After the termination of the dropwise addition, the mixture was further stirred for 10 minutes (400 rpm), and heated to 80° C. over 30 minutes while stirring. Thereafter, the mixture was further aged for 5 minutes. The resulting water-based liquid of zeolite was filtered, and washed with water until the filtrate had a pH of less than 12. The filtrate was dried at 100° C. for 13 hours, and crushed for 1 minute with a cooking cutter. The resulting powder was subjected to powder X-ray diffraction measurement. As a result, it was confirmed that A-type zeolite (powder X-ray diffraction intensity ratio: 62%) was formed. In addition, the average primary particle size of the zeolite particles was 0.2 μm.

(2) Pulverization of Zeolite

The zeolite was pulverized, and the concentration of Al eluted therefrom was quantified by ICP analysis, in the same manner as in Example 1. The concentration of the total Al contained in the zeolite in the water-based liquid of 20% zeolite was 3% of the liquid, and the concentration of eluted Al obtained by the ICP analysis was 1300 ppm. The proportion of the amount of the eluted Al in the amount of the total Al was found to be 4.3%. In addition, various properties of the zeolite were determined in the same manner as in Example 1.

Comparative Example 2

Various properties of the zeolite were determined in the same manner as in Example 1 using a commercially available A-type zeolite (TOYOBUILDER, commercially available from Tosoh Corporation), except that zeolite was not pulverized in this Comparative Example.

Comparative Example 3

Various properties of the zeolite were determined in the same manner as in Example 1 using a commercially available 4A zeolite (TOYOBUILDER, commercially available from Tosoh Corporation). Here, the concentration of the total Al contained in the zeolite in the water-based liquid of 20% zeolite was 3% of the liquid, and the concentration of eluted Al obtained by ICP analysis after the pulverization was 1200 ppm. The proportion of the amount of the eluted Al in the amount of the total Al was found to be 4%.

Comparative Example 4

The amount 155 g of propylene glycol (molecular weight: 76, commercially available from Wako Pure Chemical Industries) was added to 400 g of an aqueous sodium aluminate solution ($Na_2O$: 21.01%, $Al_2O_3$: 28.18%) contained in a 2 L-stainless container, while stirring with Teflon agitation blades each having a length of 11 cm at 400 rpm. The resulting mixture was heated at 50° C. for 20 minutes using a mantle heater. The amount 445 g of No. 3 water glass ($Na_2O$: 9.68%, $SiO_2$: 29.83%, commercially available from Osaka Keiso) was added dropwise to the resulting solution over 5 minutes using a roller pump. After the termination of the dropwise addition, the mixture was further stirred for 10 minutes (400 rpm), and heated to 80° C. over 30 minutes while stirring. Thereafter, the mixture was further aged for 60 minutes. The resulting water-based liquid of fine zeolite particles was filtered, and washed with water until the filtrate had a pH of less than 12. The filtrate was dried at 100° C. for 13 hours, and crushed for 1 minute with a cooking cutter. The resulting powder was subjected to powder X-ray diffraction measurement. As a result, it was confirmed that A-type zeolite (powder X-ray diffraction intensity ratio: 61%) was formed. In addition, the average primary particle size of the zeolite particles was 0.2 μm. The zeolite was pulverized, and evaluated in the same manner as in Example 1. The concentration of the total Al in the water-based liquid of 20% zeolite was 3% of the liquid, and the concentration of eluted Al obtained by the ICP analysis was 1300 ppm. The proportion of the amount of the eluted Al in the amount of the total Al was found to be 4.3%. In addition, various properties of the zeolite were determined in the same manner as in Example 1.

The feeding composition of zeolite is shown in Table 1, and the results described above are summarized in Table 2.

TABLE 1

| | Examples | | | Comparative Examples | | | |
|---|---|---|---|---|---|---|---|
| | 1 | 2 | 3 | 1 | 2 | 3 | 4 |
| Feeding Composition Molar Ratio | | | | | | | |
| $SiO_2/Al_2O_3$ | 2.0 | 2.0 | 2.0 | 2.0 | — | — | 2.0 |
| $Na_2O/Al_2O_3$ | 1.9 | 1.9 | 1.9 | 3.0 | — | — | 1.9 |
| $CaO/Al_2O_3$ | 0 | 0 | 0 | 0.02 | — | — | 0 |
| $Na_2O/H_2O$ | 0.078 | 0.078 | 0.078 | 0.065 | — | — | 0.078 |
| $Al_2O_3/H_2O$ | 0.042 | 0.042 | 0.042 | 0.022 | — | — | 0.042 |
| Crystallization Inhibitor (%) | 19 | 14 | 6.8 | 0 | 0 | 0 | 15 |
| Solid Content (%) | 36 | 38 | 41 | 35 | — | — | 37 |

TABLE 1-continued

|  | Examples | | | Comparative Examples | | | |
| --- | --- | --- | --- | --- | --- | --- | --- |
|  | 1 | 2 | 3 | 1 | 2 | 3 | 4 |
| Product Composition Molar Ratio | | | | | | | |
| $SiO_2/Al_2O_3$ | 2.0 | 2.0 | 2.0 | 2.0 | 2.0 | 2.0 | 2.0 |
| $Na_2O/Al_2O_3$ | 1.1 | 1.1 | 1.0 | 1.1 | 1.1 | 1.1 | 1.1 |
| $CaO/Al_2O_3$ | 0 | 0 | 0 | 0.02 | 0 | 0 | 0 |
| Crystal Form | A-Type | A-Type | A-Type | A-Type | A-Type | A-Type | A-Type |

TABLE 2

|  | Examples | | | Comparative Examples | | | |
| --- | --- | --- | --- | --- | --- | --- | --- |
|  | 1 Prepared and Pulverized | 2 Prepared and Pulverized | 3 Prepared and Pulverized | 1 Prepared and Pulverized | 2 Commercially Available Product | 3 Commercially Available Product, Pulverized | 4 Prepared and Pulverized |
| Zeolite | | | | | | | |
| Crystallization Inhibitor (Molecular Weight) | Nonionic Surfactant (454) | Polyethylene Glycol (600) | Acrylate Polymer (10000) | — | — | — | Propylene Glycol (76) |
| Average Primary Particle Size (μm) [Variation Coefficient] (%) | | | | | | | |
| Before Pulverization | 0.03 [16] | 0.03 [23] | 0.03 [14] | 0.2 [30] | 1.8 [30] | 1.8 [30] | 0.2 [30] |
| After Pulverization | 0.03 [20] | 0.03 [25] | 0.03 [20] | 0.03 [18] | — | 0.04 [100] | 0.03 [20] |
| Average Aggregate Particle Size (μm) | | | | | | | |
| Before Pulverization | 15 | 17 | 9.9 | 3.2 | 4.0 | 4.0 | 16 |
| After Pulverization | 0.37 | 0.33 | 0.40 | 0.38 | — | 0.48 | 0.40 |
| $A_r$ (%) | | | | | | | |
| Before Pulverization | 53.4 | 52.7 | 50.4 | 61.0 | 66.2 | 66.2 | 60.6 |
| After Pulverization | 35.1 | 42.3 | 34.0 | 27.2 | — | 43.3 | 27.4 |
| Crystallinity Degradation Ratio (%) | 34.3 | 19.7 | 32.5 | 55.4 | — | 34.6 | 54.8 |
| Amount of Eluted Al (%) | | | | | | | |
| Before Pulverization | 0.7 | 0.2 | 0.3 | 0.2 | 0.1 | 0.1 | 0.2 |
| After Pulverization | 3.0 | 2.3 | 2.3 | 4.3 | — | 4.0 | 4.3 |
| Powder X-Ray Diffraction Intensity Ratio (%) | | | | | | | |
| Before Pulverization | 46 | 48 | 49 | 62 | 100 | 100 | 61 |
| After Pulverization | 28 | 28 | 30 | 24 | — | 47 | 25 |
| Cationic Exchange Rate (mg/g) | 220 | 220 | 220 | 210 | 160 | 210 | 210 |
| Cationic Exchange Capacity (mg/g) | 220 | 220 | 220 | 220 | 220 | 220 | 220 |
| Turbidity (%) | 17 | 25 | 29 | 24 | 50 | 32 | 30 |
| Detergent Composition | | | | | | | |
| Deterging Rate (%) | 60 | 60 | 60 | 45 | 50 | 47 | 45 |
| Rinsing Performance | ○ | ○ | ○ | ○ | X | Δ | Δ |

It is clear from Examples 1 to 3 that there can be obtained fine A-type zeolite particles having an average primary particle size of 0.1 μm or less by carrying out the reaction of preparing zeolite in the presence of crystallization inhibitor according to the process for preparing fine zeolite particles of the present invention. In Comparative Example 4 where the reaction of preparing zeolite is carried out in the presence of a propylene glycol, which is an organic compound having an oxygen-containing functional group, the molecular weight of the compound is 76, so that fume zeolite particles having an average primary particle size of 0.1 μm or less are not obtained.

In addition, the average aggregate particle size of the zeolite particles of Examples and Comparative Examples can be adjusted to 0.4 μm or less by an appropriate pulverization. However, in the zeolite particles of Comparative Examples 1, 3 and 4, of which average primary particle size before pulverization is more than 0.1 μm after the pulverization, the crystallinity degradation progresses, the deterioration of the average primary particle size distribution is observed, and the amount of the eluted Al is increased. Therefore, it is seen that the deterging rate and/or the rinsing performance of the detergent compositions obtained using the zeolite is lowered. On the other hand, in Examples 1 to 3, the progress of the crystallinity degradation (for example, crystallinity degradation ratio) is suppressed, and the average primary particle size distribution is not substantially changed, even when the zeolite is pulverized. Therefore, in these Examples, there are obtained fine zeolite particles which have a desired average aggregate particle size and excellent cationic exchange abilities, so that it is seen that the deterging rate and the rinsing performance of the detergent compositions obtained by using the zeolite are high.

Industrial Applicability

According to the present invention, there can be obtained fine zeolite particles having an average primary particle size of 0.1 μm or less and excellent cationic exchange abilities, with a small amount of Al eluted in water in a water-based liquid as well as a low turbidity of water of the liquid. In addition, there can be obtained a detergent composition comprising the fine zeolite particles, which is highly excellent in the detergency and rinsing performance. The fine zeolite particle of the present invention is suitably used for detergent builders, water treatment agents, fillers for paper, resin fillers, oxygen-nitrogen separating agents, adsorbents, catalyst carriers, soil improvers for gardening, polishing agents, and the like.

What is claimed is:

1. A fine A-type zeolite particle having an average primary particle size of 0.1 μm or less and a variation coefficient of 90% or less, wherein a ratio of a peak area above a background level to all peak area in the range of 2θ=20° to 40° in a powder X-ray diffraction spectrum of said fine A-type zeolite particle is 30% or more.

2. The fine A-type zeolite particle according to claim 1, wherein the fine A-type zeolite particle has an average aggregate particle size of 0.4 μm or less.

3. The fine A-type zeolite particle according to claim 1 or 2, wherein when water-based liquid of the particle is prepared, a ratio of the amount of Al eluted in water is less than 4% by weight of all the amount of Al contained in the zeolite.

4. The fine A-type zeolite particle according to claim 1, wherein the fine A-type zeolite particle has a cationic exchange rate is 180 mg $CaCO_3$/g or more.

5. A process for preparing the fine A-type zeolite particle of claim 1, comprising reacting a silica source with an aluminum source in the presence of an organic compound having an oxygen-containing functional group and a molecular weight of 100 or more.

6. The process according to claim 5, wherein the oxygen-containing functional group is at least one of OR group and COOR group, wherein R is at least one member selected from a saturated or unsaturated organic group having 1 to 22 carbon atoms, hydrogen atom and an alkali metal atom.

7. A detergent composition comprising a surfactant and the fine A-type zeolite particle of claim 1.

* * * * *